June 12, 1962 F. A. DURAND, SR 3,038,605
MACHINE FOR SORTING ARTICLES BY SIZE
Filed June 2, 1959 3 Sheets-Sheet 1
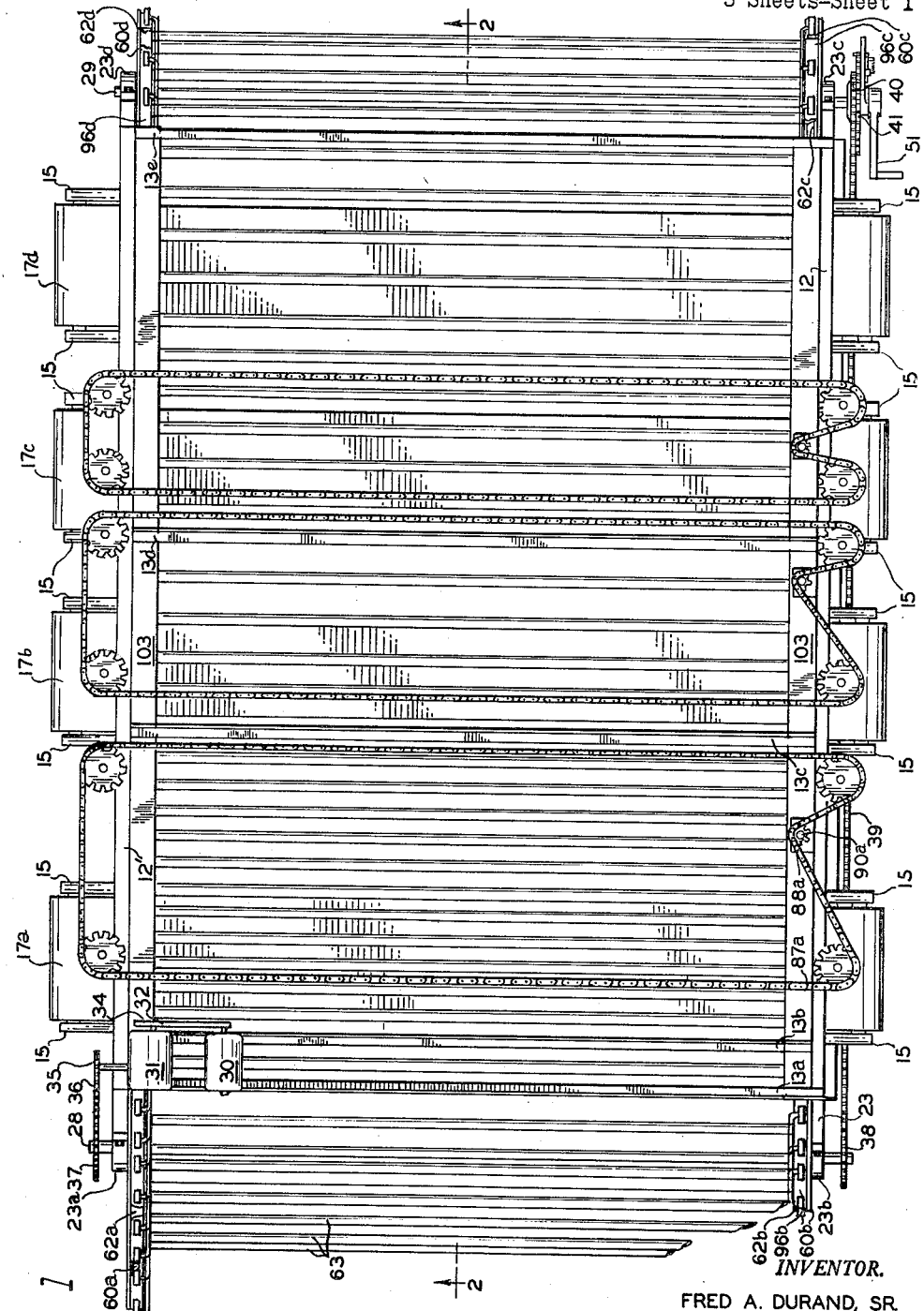
INVENTOR.
FRED A. DURAND, SR.
BY
ATTORNEY June 12, 1962 F. A. DURAND, SR 3,038,605
MACHINE FOR SORTING ARTICLES BY SIZE
Filed June 2, 1959 3 Sheets-Sheet 2
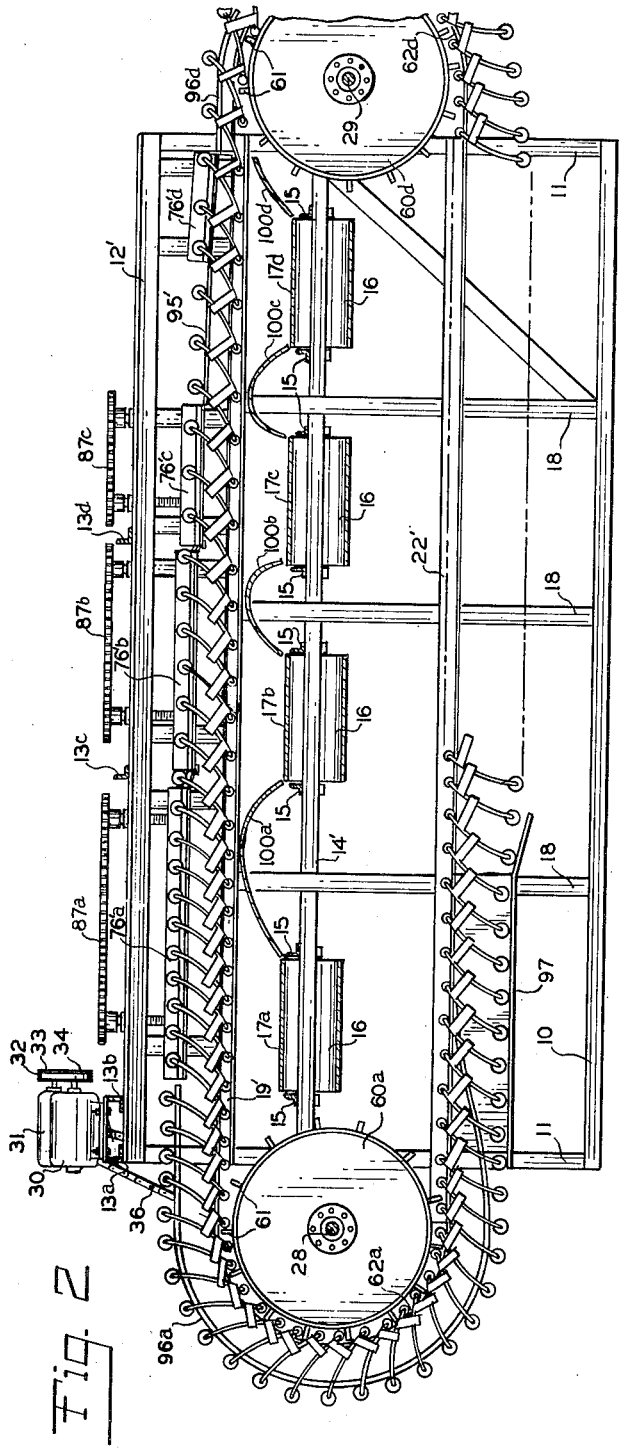
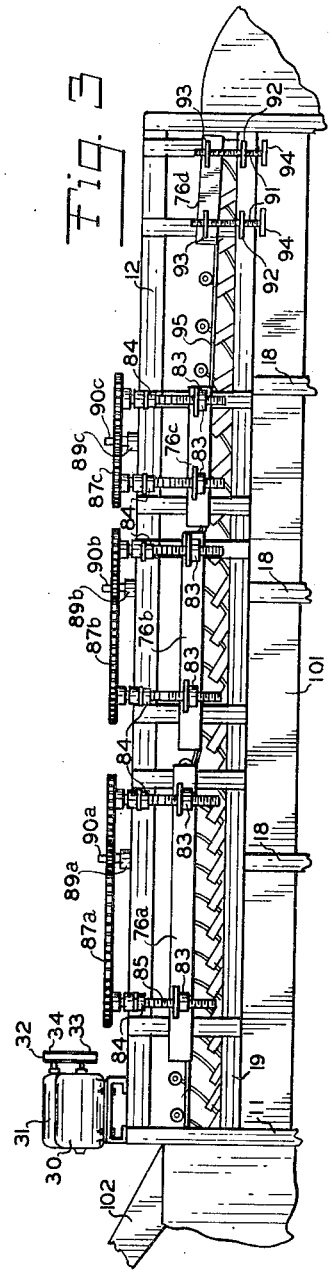
*INVENTOR.*
FRED A. DURAND, SR.
BY
ATTORNEY June 12, 1962     F. A. DURAND, SR     3,038,605
MACHINE FOR SORTING ARTICLES BY SIZE
Filed June 2, 1959     3 Sheets-Sheet 3
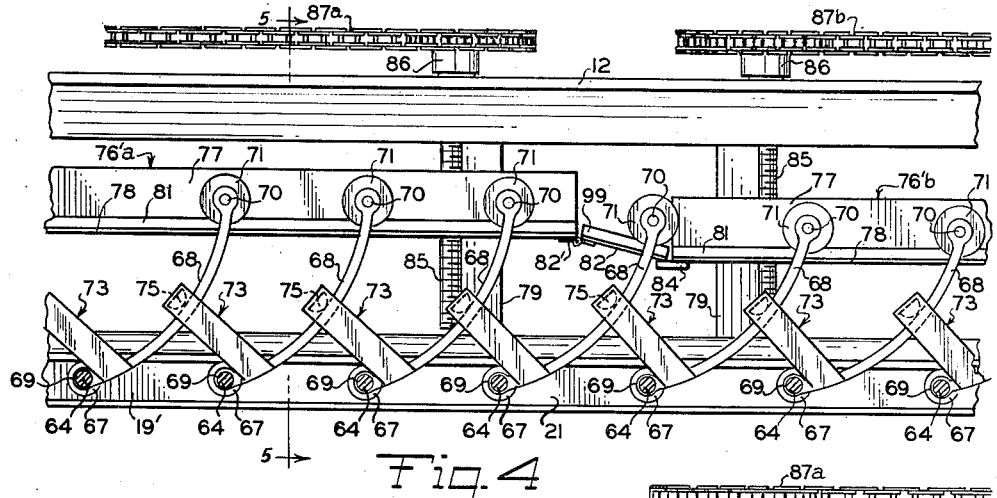
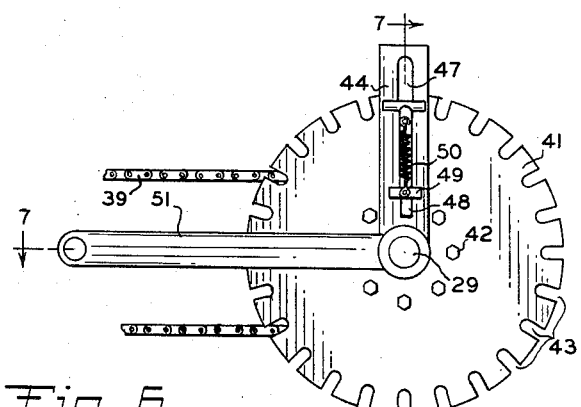
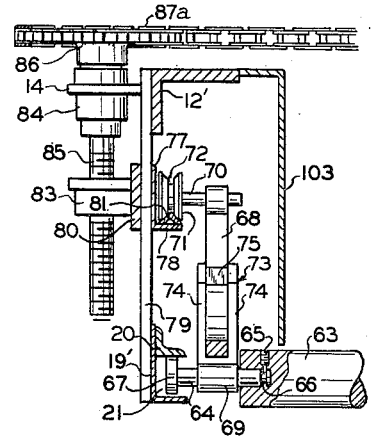
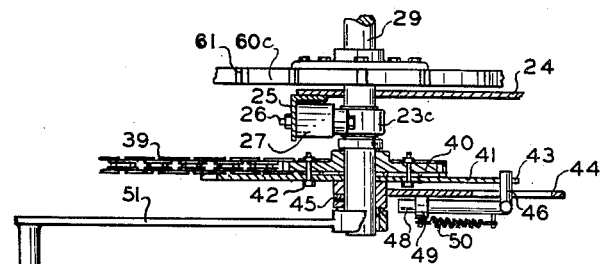
INVENTOR.
FRED A. DURAND, SR.
BY
ATTORNEY

United States Patent Office 3,038,605
Patented June 12, 1962

3,038,605
MACHINE FOR SORTING ARTICLES BY SIZE
Fred A. Durand, Sr., Woodbury, Ga., assignor to Durand Machinery, Inc., Woodbury, Ga., a corporation of Georgia
Filed June 2, 1959, Ser. No. 817,527
15 Claims. (Cl. 209—102)

This invention relates to a machine for sorting articles by size and is more particularly concerned with a machine for grading according to diameter fruits and vegetables such as apples, oranges, grapefruit, potatoes and the like.

In the past many machines have been devised for sorting by size and other physical characteristics fruits and vegetables. The recently issued patent to Lindemann et al. No. 2,860,779 is illustrative of but one such machine.

Since machines of the general class to which the present invention relates must usually operate in sheds open to rain and dust, it is usually highly important to provide in such machines few fragile, delicate or precision made parts which will be affected by corrosion and dirt.

My invention attempts to provide an accurate sizing machine which is durable and efficient, and contains essentially no precision parts. Briefly, my machine includes a frame which supports discs for feeding a plurality of parallel transverse conveying members in a continuous longitudinal path, thereby providing a top flight of such members which receive the fruits or vegetables to be sized. Linking mechanisms joining the ends of successive conveying members permit one conveying member to pull the next, etc., and also permit variation in the distance between adjacent conveying members in accordance with the radial position of the link members. This radial position, in turn, is controlled by the heights of successive adjustable increments of track over which ride the wheels of the linking mechanisms. Between the top flight of conveying members and bottom or return flight of conveying members are several transverse discharge conveyors which receive the sized fruit dropped as the conveying members are moved away from each other in accordance with the predetermined position of the track. Thus, the fruits or vegetables of essentially one size are fed from the machine on one conveyor and of another size on another conveyor, etc.

Accordingly, it is an object of the present invention to provide a durable and efficient sorting machine which will effectively sort fruits and vegetables according to their size or diameter.

Another object of the present invention is to provide a machine for grading articles which machine contains a novel and improved linkage mechanism between successive conveying members therein so as to reduce wear and power requirements in causing the conveying members to be spaced and traverse the machine.

Another object of my invention is to provide a machine for grading articles which may be started and stopped without danger of the conveying members damaging the fruits and vegetables contained thereon.

Another object of my invention is to provide a machine for grading articles which may be easily and quickly repaired.

Another object of my invention is to provide a machine for grading articles in which the spacing between successive conveying members may be materially varied within a very short distance of travel of the conveying members.

Other and further objects, features and advantages of the present invention will become apparent from the following description when taken in conjunction with the accompanying drawings wherein like characters of reference designate corresponding parts throughout the several views and wherein:

FIG. 1 is a plan view of a machine constructed in accordance with the present invention.

FIG. 2 is a vertical sectional view taken along line 2—2 in FIG. 1.

FIG. 3 is a fragmentary side elevational view of the machine shown in FIG. 1.

FIG. 4 is an enlarged side elevational view of the linkage mechanism, tracks and rail members of the machine shown in FIG. 1.

FIG. 5 is a cross sectional view taken along line 5—5 in FIG. 4.

FIG. 6 is an enlarged plane view of a detail showing the take-up adjusting means of the machine shown in FIG. 1.

FIG. 7 is a sectional view taken along the lines 7—7 in FIG. 6.

Referring now in detail to the embodiment chosen for the purpose of illustrating the present invention, numeral 10 denotes a rectangular base of a frame structure mounted on a suitable supporting surface. A plurality of spaced upright end standards 11 project from the corners of base 10 and are provided at their upper ends with an upper frame including spaced longitudinal beams 12, 12' and a plurality of transverse ribs 13a, 13b, 13c, 13d and 13e. Below the longitudinal beams 12, 12' respectively are a pair of longitudinal bracket supporting struts 14, 14' secured to intermediate portions of standards 11.

Protruding outwardly from struts 14, 14' are a plurality of opposed pairs of longitudinally aligned brackets 15 which support for rotation the transversely opposed rolls 16 which, in turn, support the transverse discharge conveyor belts 17a, 17b, 17c and 17d disposed at spaced intervals along the length of the machine.

Within the frame structure between adjacent belts 17a, 17b, 17c, 17d are reinforcing upright standards 18 which are secured at their lower ends to base 10 and at their intermediate portions to struts 14, 14'. The upper ends of standards 18 project above struts 14, 14' and terminate below beams 12, 12'. Across the upper ends of standards 18 are a pair of opposed longitudinally extending upper guide tracks 19, 19', the end portions of which are secured to the inside surfaces of end standards 11. As best seen in FIGS. 4 and 5, the guide tracks 19, 19' are angle irons with horizontal and vertical flanges, the horizontal flanges protruding inwardly of the frame structure. Above each of guide tracks 19, 19' is a second angle iron or retaining flange, such as flange 20, so as to provide between each horizontal flange of guide tracks 19, 19' and the retaining flange 20, a longitudinal disposed inwardly opening channel 21 open at both eds.

Parallel to upper guide tracks 19, 19' and spaced vertically therebelow are a pair of opposed lower guide tracks 22, 22', the lower guide tracks 22, 22' being secured along the inside surfaces of standards 11 and 18 and terminating slightly outwardly of standards 11.

Forward main bearings 23a, 23b and rearward main bearings 23c, 23d are provided at the forward and rearward ends of the frame structure, being in a horizontal plane substantially midway between the upper track 19, 19' and lower tracks 22, 22'. Each of the main bearings 23a, 23b, 23d is supported in a suitable manner from one of standards 11 by a shock absorber 23. The bearing 23c, however, is supported by a metal plate 24 and an angle iron 25 welded to the metal plate 24, as shown in FIG. 7. Bolt 26, passing through shock absorber 27, secures the main bearing 23c in place. Thus, the bearings 23a, 23b, 23c, 23d journal for rotation the transverse forward drive shaft 28 and the transverse rear drive shaft 29 outwardly of the frame structure.

For supplying power to rotate both shafts 28 and 29 in synchronization, I have provided a motor 30 mounted on ribs 13a, 13b. Mounted adjacent motor 30 or ribs 13a, 13b is a gear reducer 31 driven from motor 30 by belt 32 and pulleys 33, 34. The output shaft of gear reducer 31 protrudes transversely parallel to shaft 28 and is provided with a sprocket 35 driving continuous chain 36 trained over sprocket 37 fixed to one end of shaft 28.

For driving shaft 29, a sprocket 38 is mounted on the other end of shaft 28 and drives by means of continuous chains 39 a sprocket 40 journalled on the end of shaft 29.

As best seen in FIG. 7, the sprocket 40 is secured, by means of a plurality of bolts 42, to a flat disc 41 journalled on shaft 29 outwardly of sprocket 40. The outer periphery of disc 41 is provided with a plurality of evenly spaced, outwardly opening, radial slots 43. An interlock arm 44, fixedly mounted on shaft 29 outwardly of disc 41 by means of a set screw 45, protrudes radially adjacent disc 41 and beyond the periphery thereof. An interlock finger 46 which extends through a slot 47 in arm 44 is adapted to selectively engage any one of slots 43. This finger 46 is slidably carried by a positioning rod 48 journalled in bearing 49 on arm 44 and is normally urged into one of slots 43 by a spring 50 extending between bearing 49 and rod 48. A hand crank 51 on the end of shaft 29 provides a means for manually jacking shaft 29 around.

It is therefore seen that when finger 46 is urged against spring tension of spring 50, outwardly of the periphery of disc 41, the shaft 29 may be rotated free from sprocket 40. This is so that the conveying members, to be hereinafter described, may be tightened or loosened.

Immediately inwardly of the bearings 23a, 23b, 23c and 23d on shafts 28 and 29 respectively are opposed pairs of driving sprockets comprising the conveying member driving discs 60a, 60b, 60c, 60d, the periphery of each of which is provided with a plurality of outwardly projecting radial tines 61. Discs 60a, 60d are aligned, longitudinally, with the channel of upper track 19' and discs 60b, 60c are aligned, longitudinally, with the channel of upper track 19. Retaining straps 62a, 62b, 62c, 62d extending from the ends of lower tracks 22, 22' around the tines 61 of the discs 60a, 60b, 60c, 60d, respectively, to terminate at the ends of the retaining flanges of the upper tracks 19, 19'.

According to the present invention, a plurality of transversely disposed parallel bars or conveying members 63 are provided for continuous travel in one direction above the discharge conveyor belts 17a, 17b, 17c, 17d, and in the opposite direction below the conveyor belts 17a, 17b, 17c, 17d. Each member 63 is provided with concentric, outwardly protruding, rotatable stub shafts 64 retained in the recesses in the ends thereof by set screws, such as screw 65, protruding into a peripheral groove, such as groove 66. The outer ends of the stub shafts are provided with rollers 67 which ride in the opposed chutes, such as chute 21, and are adapted to be carried between adajacent tines 61 around shafts 28 and 29 and move along the lower tracks 22, 22'. Thus it is seen that successive conveying members 63 supported by rollers 64 may move in a continuous path around the discharge conveyor belts 17a, 17b, 17c and 17d.

For linking successive conveying members 63 together and for varying the horizontal distance therebetween, I have provided linking mechanisms between successive members 63. Each linking mechanism includes a pair of arcuate camming arms 68 provided with bearing members 69 at their lower ends. These camming arms 68 slope rearwardly and upwardly of the machine in the top flight of conveying members 63. In other words, all camming arms 68 slope forwardly and upwardly with respect to the direction of travel of the conveying members 63.

The stub shafts 64 are journalled by bearing members 69 so that the camming arms 68 may pull the conveying member 63. The upper ends of the camming arms 68 are provided with outwardly extending stub shafts 70 having at their outer ends wheels 71. Each wheel 71 is provided with a peripheral groove 72, as shown in FIG. 5.

As best seen in FIG. 4, rigid coupling members 73 extend, with respect to the direction of travel of conveying members 63, rearwardly and upwardly from the lower portion of arms 68. Each coupling member 73 includes a pair of spaced cam follower carrying arms 74, best seen in FIG. 5. The carrying arms 74 pass on opposite sides of the camming arm 68 connected to conveying member 63 which is rearwardly adjacent the camming member 63 with respect to the direction of travel of conveying members 63. A cam follower 75 joins the ends of carrying arms 74 together. Thus it is seen that each conveying member 63 is connected to the next adjacent conveying member to form a continuous chain, and by pivoting movement of the camming arms 68, the space between adjacent conveying members 63 may be varied.

As seen in FIGS. 2 and 3, above the upper tracks 19, 19' are the wheel supporting rail members 76a, 76b, 76c, 76d and 76'a, 76'b, 76'c, 76'd. The rail members 76a, 76'a extend longitudinally from a position vertically over the forward edge of conveyor belt 17a and terminate immediately before a position vertically over the forward edge of conveyor belt 17b. Similarly, the rail members 76b, 76'b extend from a position vertically above the forward edge of conveyor belt 17b and terminate short of a position vertically above conveyor belt 17c while rail members 76c, 76'c extend across conveyor belt 17c. It will be noted, however, that rail members 76d, 76'd extend from a position centrally over conveyor belt 17d to the end of the frame structure and is supported differently as will be described more fully hereinafter.

Each of rail members 76a, 76b, 76c, 76d, 76'a, 76'b, 76'c, 76'd includes a vertical slide plate 77 and a horizontal rail supporting plate 78 protruding inwardly from the lower edge of plate 77 as seen in FIG. 5. Each vertical slide plate 77 is adapted to slide along the inner surfaces of spaced vertical struts 79 extending between beams 12, 12' and guide tracks 19, 19' and is retained for slidable movement by an outer retaining plate 80 secured to plate 77, each retaining plate 80 being provided with recessed portions which encompass the sides and outer portions of the struts 79.

Mounted on the upper surface of each rail supporting plate 78 is an inverted V-shaped rail 81 along which the wheels 71 are adapted to ride as shown in FIG. 5. As seen in FIG. 4, to provide a continuous path for the wheels 71 from one rail 81 to the next, I have provided connector members between the adjacent ends of each of rail members 76a, 76b, 76c, 76'a, 76'b, 76'c. Each connector member includes a flat plate, such as plate 82, which supports a rail section 99 aligned with rails 81. The flat plate 82 is pivotally connected by one end to the end of one of plates 81 by means, such as hinge 82', connected to rail member 76'a. A bearing flange, such as flange 84, protrudes from the end of the adjacent plate, such as plate 81 of rail member 76'b, and supports the other end of plate 82. Thus, the adjacent rail members, such as members 76'a and 76'b, may be raised or lowered with respect to each other without affecting the path of travel of wheels 71.

Protruding outwardly from the retaining plate 80 of each of the rail members 76a, 76b, 76c, 76'a, 76'b, 76'c are a pair of spaced positioning blocks 83, each being provided with a vertical bore which is internally threaded. Above the positioning blocks 83 and protruding outwardly from beams 12, 12' are journal members 14 which journal for rotation the adjustment screws 85. The lower ends of the adjustment screws 85 protrude through the threaded bores of the positioning blocks 83 and are provided with external threads, engaging the internal threads of the bores. The upper ends of adjustment screws 85 are provided with sprockets 86 above journal members 84. The wheel portion of each sprocket t86 protrudes above the upper surface of beams 12, 12' and the hub portion thereof bears against the upper surface of its journal member 84.

For rotating the four sprockets 86 connected to rail members 76a, 76'a in synchronization to thereby raise or lower the rail members 76a, 76'a by an equal amount, a continuous chain 87a, passing horizontally above the frame structure, encompasses these sprockets 76 and is engaged by a drive sprocket 88a provided with a shaft 90a journalled by bearing block 89a supported on the upper surface of beam 12. The upper end of shaft 90a protrudes above the sprocket 88a and is adapted to receive a hand crank (not shown) by which sprocket 88a may be rotated. Similarly, the sprockets 86 of rail members 76b, 76'b are provided with chain 87b, sprocket 88b, bearing 89b and shaft 90b while the sprockets of rail members 76c, 76'c are provided with chain 87c, sprocket 88c, bearing 89c and shaft 90c. Thus the pairs of opposed rail members 76a, 76'a and 76b, 76'b and 76c, 76'c may be raised or lowered respectively.

The rail members 76d, 76'd, however, are each provided with a pair of individual adjustment screws 91 journalled by journal members 92 and threadably engaging positioning blocks 93. The journal members 92 protrude outwardly from tracks 19, 19' below the positioning blocks 93 which protrude outwardly from rail members 76d, 76'd. At the lower end of each adjustment screw 91 is a handle 94 for rotating the same, as seen in FIG. 3.

Connector members 95, 95' which extend between the adjacent ends of rail members 76c, 76'c and 76d, 76'd are hingedly connected to rail members 76c, 76'c respectively by their forward ends and their rea rends ride on the horizontal upper surfaces of rail members 76d, 76'd respectively.

As illustrated in FIGS. 1 and 2, a pair of guide straps 96c, 96d supported from end standards 11 are about aligned with the rails of rail members 76d, 76'd so as to receive the wheels 71 as they pass therefrom. As seen in FIG. 2, the guide straps, such as strap 96d, extend in spaced parallel relationship to the retaining straps 62c and 62d and terminate slightly beyond the vertical position of drive shaft 29 so that the rollers 67 of each linking mechanism are firmly retained between adjacent tines 61 before wheels 71 reach the end of straps 96c, 96d.

At the forward end of the machine are the guide straps 96a and 96d diverging respectively from the lower surfaces of intermediate portions of lower guide tracks 22, 22' and then passing around retaining straps 62a, 62b at spaced predetermined distances to terminate adjacent the forward ends of rail members 76a, 76'a. Preferably the guide straps 62a, 62b terminate above the uppermost portion of the rails 81 of rail members 76a, 76'a when the same are in their uppermost positions.

Ramps, such as ramp 97, are provided below guide straps 96a, 96b, the ramps being flat metal plates, begin about centrally of the frame and taper upwardly toward the forward end of the machine. Ramps, such as ramp 97, are secured to the inner surfaces of the forward standards 11 and the forwardmost standards 18, the forward end of the ramps terminating at the forward standards 11, spaced below the straps 96a, 96b by a distance slightly greater than the diameter of wheels 71.

Formed of metal sheeting are a plurality of transversely disposed inverted U-shaped baffles 100a, 100b and 100c which are supported transversely between standards 18 and extend longitudinally between the adjacent conveyor belts 17a, 17b, 17c and 17d as seen in FIG. 2 to deflect the dropped articles onto one belt or the other. The baffle 100d serves a similar purpose but simply deflects the articles onto belt 17d.

Also of sheet metal is a conveyor belt shield 101 mounted, as shown in FIG. 3, on the inside surfaces of standards 11 and 18 and extending down from guide track 19 to terminate immediately above conveyor belts 17a, 17b, 17c and 17d. If desired, a similar plate may be placed on the opposite side of the frame. These plates, such as plate 101, prevent the sorted articles from inadvertently rolling or bouncing off of the conveyor belts 17a, 17b, 17c, 17d as they are dropped by the conveying members 63. There is, however, sufficient clearance between the lower edge of shields and the upper surface of conveyor belts 17a, 17b, 17c, 17d so that the articles on the respective belts may be carried by the belts outwardly of the frame.

A short metal chute 102 is provided, as shown in FIG. 3, to feed articles to be sorted onto the moving conveying members 63 while guards 103, 103', which extend inwardly over the linking mechanism from the inner edge of beams 12, 12' and then downwardly to terminate above stub shafts 64, prevent the articles from becoming lodged in the linking mechanism.

*Operation*

When my machine is to be placed in operation, the interlock finger 46 is moved outwardly in slot 47 to thereby disengage the sprocket 40 and disc 41 from arm 44. This permits the shaft 29 to be rotated independently of shaft 28. By disengaging the drive between shafts 28 and 29, opposite pressure of the tines 61 of discs 60a, 60b and discs 60c, 60d against rollers 67 is relieved, thereby permitting slack in the upper flight of conveying members 63. Next, the height of the respective pairs of rail members 76a, 76'a; 76b, 76'b; 76c, 76'c; and 76d, 76'd are adjusted by individual rotation of shafts 90a, 90b, 90c and handles 94. The height of rail members 76a, 76'a, 76b, 76'b, 76c, 76'c, 76d, 76'd are arranged in staggered declining stair-step fashion so that rail members 76a, 76'a are spaced furtherest from upper tracks 19, 19', rail members 76b, 76'b are closer to upper tracks 19, 19' and rail members 76c, 76'c are still closer to tracks 19, 19'. Rail members 76d, 76'd are arranged sloping toward guide straps 96c, 96d so that the adjacent ends of the respective members are aligned.

Thereafter, crank 51 is rotated to tighten the linking mechanisms along the upper flight of conveying members 63, the interlock finger 46 being disengaged from any of slots 43 during the rotation of crank 51.

With the machine properly adjusted, motor 30 is started. As explained above, motor 30 drives both shafts 28 and 29 at the same speed in the same direction. This causes rotation of discs 60a, 60b, 60c and 60d at the same peripherical speed in the same direction. The tines 61 of discs 60a, 60b, 60c, 60d engage the rollers 67 as they pass between the outer peripheries of discs 60a, 60b, 60c, 60d and the retaining straps 62a, 62b, 62c, 62d and thus impart motion to the conveying members 63. Articles, such as apples, peaches, oranges and the like which are to be sorted according to size, are then fed down the inclined chute 102 and deposited continuously on the upper flight of conveying members 63 adjacent the forward end standards 11. Since the rail members 76a, 76'a are relatively higher than the subsequent rail members, there is a predetermined wide vertical space between the rollers 67 and the wheels 71 in the channel of the upper tracks 19, 19'. Thus, the camming arms 68, riding in the zone over conveyor 17a, are at a relatively large angle with respect to the horizontal and hence the coupling members 73, which are rigidly secured to these camming arms 68, are tilted to a relatively small angle with respect to the horizontal. Therefore, the cam followers 75 of the coupling members 73 ride at the lower portion of the camming arms 68 to establish a predetermined short space between adjacent conveying members 63 in that zone. We therefore, see that as conveying members 63 pass above the zone of the first conveyor belt 17a, only the articles having a diameter less than the space between successive conveying members 63 are dropped through between this space onto belt 17a. Belt 17a then conveys these articles outside the frame and deposits them in a suitable receptacle (not shown). It should be noted here that power for the discharge conveyor belts 17a, 17b, 17c, 17d is usually supplied from other conveyors in the plant and hence no means for rotating the drums 16 is illustrated. It will be understood, of course, that any conventional means for driving these belts 17a, 17b, 17c, 17d may be employed.

As the upper flight of conveying members 63 continues its travel from left to right in FIG. 1, the wheels 71 of link mechanisms pass from the rails 81 of rail members 76a, 76'a to the rails of rail members 76b, 76'b and thence to the rails of rail members 76c, 76'c. The rail members 76b, 76'b are arranged below rail members 76a, 76'a and the rail members 76c, 76'c are arranged lower than rail members 76b, 76'b. Therefore, when wheels 71 reach rail members 76b, 76'b, the angle from the horizontal of the camming arms 67 connected to those wheels 71 is reduced, thereby increasing the angle from the horizontal of coupling members 73. The simultaneous increase in the angle of coupling members 73 and decrease in the angle of camming members 68 thus permits the cam followers 75 of the coupling members 73 to ride upwardly on the camming arms 68 to increase the distance between the adjacent conveying members 63 to which the particular coupling member 73 and camming arm 68 are connected.

It is therefore seen that, as the conveying members 63 pass over the conveying belt 17b, the spaces between the adjacent conveying members 63 are increased to drop all those articles having a diameter greater than the previous space between the conveying members 63 in the zone of conveyor belt 17a but being less diameter than the space between the same conveying members 63 in the zone of conveyor belt 17b. Similarly, the articles having a diameter greater than the space between the conveying members 63 in the zone of conveyor belt 17b and less than space between the conveying members 63 in the zone of conveyor belt 17c are dropped onto conveyor belt 17c.

Thereafter, the rails of the connector members 95, 95' lead the wheels 71 in a converging path toward the upper tracks 19, 19', thereby causing further opening of the space between adjacent conveying members 63 to permit dropping of the largest size articles onto the final conveyor belt 17d. Thence wheels 71 pass along the rails of rail members 76d, 76'd and over the guide straps 96c, 96d.

It will be remembered that the power for causing continuous movement of the conveying members 63 is supplied from motor 30 through gear trains, and sprockets and chains to both shafts 28 and 29 to cause simultaneous rotation of both in the same direction. This causes continuous rotation of the discs 60a, 60b, 60c and 60d. The tines 61 protruding from these discs 60c, 60d therefore engage rollers 67 and carry them around discs 60c, 60d to discharge the same along lower tracks 22, 22'. It will be observed that the guide straps 96, 96' terminate along the upper arc of travel of the linking mechanisms around discs 60c, 60d and hence wheels 71 hang free during the latter part of the travel of the linking mechanisms around the discs 60c, 60d and hang pendent during the travel of rollers 67 along lower tracks 22, 22'.

During the travel along the lower tracks 22, 22', the conveying members 63 in this lower flight tend to bunch up as they pass in a direction opposite the direction of movement of the upper flight, passing below conveyor belt 17d, 17c, 17b and 17a in that order.

As the lower flight of conveying members 63 approaches, tangentially, the lower periphery of discs 60a, 60b, the tines 61 of discs 60a, 60b engage successive pairs of rollers 67, so as to move the rollers 67 around the outer peripheries of discs 60a, 60b between these peripheries and the retaining straps 62a, 62b. The rollers 67 are then discharged into the channels of upper tracks 19, 19' to begin their travel again.

As the rollers 67 approach the lower peripheries of discs 60a, 60b, the wheels of the linking mechanisms travel upwardly and outwardly along the ramps, such as ramp 97, so that sufficient space is provided between the rollers 67 that each tine 61 may project into a space between adjacent rollers 67 and engage every other roller 67 for conveying the same.

The wheels 71, after leaving the ramps 97, engage the guide straps 96a, 96b and are therefore guided around the discs 60a, 60b to be discharged along the tracks of track members 76a, 76'a. Thus the cycle commences again with the articles to be sized, continuously being fed to the conveying members 63.

It will be apparent to those skilled in the art that many variations may be made in the embodiment chosen for purpose of illustrating the present invention and that conventional opposed angle members (not shown) for sizing articles according to maximum diameter may be affixed to the respective conveying members 63, without departing from the scope of my invention. Further, elements may be combined or separated and full resort may be made to equivalents without departing from the scope of my invention as defined by the appended claims.

I claim:
1. In a sorting machine having transverse parallel conveying members spaced longitudinally from each other and moved successively in the same plane along a predetermined path, adjustable linking mechanisms connected between the ends of adjacent conveying members to join all conveying members together, each of said linking mechanisms comprising a camming arm extending from one end of one of said conveying members, a rigid coupling member fixed by one end to said camming arm adjacent the conveying member and extending toward the camming arm next adjacent thereto, the other end of said coupling member slidably engaging said next adjacent camming arm, and means for varying the angle of each camming arm in accordance with the position of its conveying member in said path to thereby vary the distance between successive conveying members.

2. In a sorting machine having transverse parallel conveying members spaced longitudinally from each other and moved successively in the same plane along a predetermined path between tracks, adjustable linking mechanisms connected between the ends of adjacent conveying members to join all conveying members together and for varying the longitudinal distance between adjacent members, each of said linking mechanisms comprising an arcuate camming arm extending from one end of one of said conveying members, a rigid coupling member fixed by one end to said camming arm adjacent the conveying member and extending toward the camming arm next adjacent thereto, the other end of said coupling member slidably engaging said next adjacent camming arm, rail members adjacent said tracks, follower means connected to each of the camming arms and adapted to ride on certain of said rail members, means for varying the distance between said rail members and said tracks, and power means for applying conveying force to said camming arms.

3. In a sorting machine having transverse parallel conveying members spaced longitudinally from each other and moved successively in the same plane along a predetermined path, adjustable linking mechanisms connected between the ends of adjacent conveying members to join all conveying members together, each of said linking mechanisms comprising an arcuate camming arm extending from one end of one of said conveying members, a rigid coupling member fixed by one end to said camming arm adjacent the conveying member and extending toward the camming arm next adjacent thereto, the other end of said coupling member slidably engaging said next adjacent camming arm, and means for varying the angle of each camming arm in accordance with the position of its conveying member in said path to thereby vary the distance between successive conveying members, said last mentioned means including spaced members along said path for engaging opposite ends respectively of said camming member.

4. In a sorting machine having a frame and transverse parallel conveying members spaced longitudinally from each other and moved successively in the same plane along said frame, tracks on said frame, rollers on the ends of said conveying members riding on said tracks, linking mechanisms connected between the ends of adjacent conveying members to join all conveying members together, each of said linking mechanisms comprising an arcuate camming arm extending from one end of one of said conveying members, a rigid coupling member fixed by one end to said camming arm adjacent the conveying member and extending toward the camming arm next adjacent thereto, the other end of said coupling member slidably engaging said next adjacent camming arm, and means for varying the angle of each camming arm in accordance with the position of its conveying member in said frame to thereby vary the distance between successive conveying members.

5. In a sorting machine having a frame, transverse conveying members spaced longitudinally from each other and moved successively in the same plane along said frame, tracks on said frame, rail members spaced above said tracks, rollers on the ends of said conveying members, linking mechanisms connected between adjacent rollers to join all conveying members together, each of said linking mechanisms comprising an arcuate camming arm extending from one of said rollers, a coupling member fixed by one end to said camming arm adjacent the conveying member and extending toward the camming arm next adjacent thereto, the other end of said coupling member slidably engaging said next adjacent camming arm, a wheel on the end of said camming arm for engaging said rail members, and means for varying the vertical distance between said rail members and said tracks for thereby adjusting the space between adjacent conveying members.

6. In a machine for sorting articles comprising a frame, a pair of tracks in a horizontal plane secured in opposed relationship on said frame, said tracks being provided with inwardly opening opposed channels, a plurality of spaced conveying members disposed transversely of said frame, rollers mounted on the ends of each of said conveying members and being adapted to ride along said tracks so as to maintain said conveying members in the same plane, linking mechanisms joining each of said conveying members for adjusting the space between adjacent members, means for moving said conveying members along said tracks, rail members carried by said frame adjacent said tracks, means for adjusting the space between individual pairs of said rail members and said tracks, said linking mechanisms each being characterized by wheels adapted to ride along said rail members, a camming arm extending from said wheel to one of said rollers, and a rigid coupling member fixed to said camming arm and slidably connected to the camming arm of the linking mechanism next adjacent thereto whereby the angular position of both said camming member and said coupling member may be varied by a variation in the distance between the channel of one of said tracks in which said one of said rollers rides and said one of said rail members on which said wheel rides to thereby vary the space between adjacent of said conveying members.

7. A machine for sorting articles comprising a frame, a pair of parallel transverse drive shafts mounted respectively at the front and back of said frame, spaced discs mounted on each of said shafts, said discs on one of said drive shafts being aligned longitudinally with said discs on the other of said drive shafts, means for rotating said drive shafts in synchronization with each other, means for adjusting the radial position of the discs on one of said drive shafts with respect to the discs on the other of said drive shafts, pairs of upper and lower tracks secured to said frame and aligned substantially tangentially with the upper and lower peripheries of said discs, said upper tracks being provided with inwardly opening opposed channels, a plurality of spaced conveying members disposed transversely of said frame, rollers mounted on the ends of each of said conveying members and being adapted to ride along said tracks, linking mechanisms joining each of said conveying members to form a continuous chain around said discs and along said tracks, said discs being adapted to propel said conveying members to provide an upper flight of conveying members moving in one direction between said upper tracks and a lower flight of conveying members moving in the opposite direction between said lower tracks, rail members carried by said frame adjacent said upper tracks, and means for adjusting the space between individual of said rail members and said upper tracks, said linking mechanisms including camming members for varying the distance between adjacent conveying members in accordance with the space between said rail members and said channels.

8. A machine for sorting articles comprising a frame, a pair of parallel transverse drive shafts mounted respectively at the front and back of said frame, spaced discs mounted on each of said shafts, said discs on one of said drive shafts being aligned longitudinally with said discs on the other of said drive shafts, means for rotating said drive shafts in synchronization with each other, means for adjusting the radial position of the discs on one of said drive shafts with respect to the discs on the other of said drive shafts, pairs of upper and lower tracks secured to said frame and aligned substantially tangentially with the upper and lower peripheries of said discs, said upper tracks being provided with inwardly opening opposed channels, a plurality of spaced conveying members disposed transversely of said frame, rollers mounted on the ends of each of said conveying members and being adapted to ride along said tracks, linking mechanisms joining each of said conveying members to form a continuous chain around said discs and along said tracks, said discs being adapted to propel said conveying members to provide an upper flight of conveying members moving in one direction between said upper tracks and a lower flight of conveying members moving in the opposite direction between said lower tracks, rail members carried by said frame adjacent said upper tracks, means for adjusting the space between individual of said rail members and said upper tracks, said linking mechanisms each being characterized by rail following means adapted to ride along one of said rail members, a camming arm extending from said rail following means to one of said rollers, and a rigid coupling member fixed to said camming arm and slidably connected to the camming arm of the linking mechanism next adjacent thereto whereby the angular position of both said camming member and said coupling member may be varied by a variation in the distance between the channel of one of said upper tracks in which said one of said rollers rides and said one of said rail members and which said rail following means rides to thereby vary the space between adjacent of said conveying members.

9. A machine for sorting articles comprising a frame, a pair of parallel transverse drive shafts mounted respectively at the front and back of said frame, spaced discs mounted on each of said drive shafts, said discs on one of said drive shafts being aligned longitudinally with said discs on the other of said drive shafts, means for rotating said drive shafts in synchronization with each other, means for adjusting the radial position of the discs on one of said drive shafts with respect to the discs on the other of said drive shafts, pairs of upper and lower tracks secured to said frame and aligned with the upper and lower peripheries of said discs, said upper tracks being provided with inwardly opening opposed channels, a plurality of spaced conveying members disposed transversely of said frame, rollers mounted on the ends of each of said conveying members and being adapted to ride along said tracks, linking mechanisms joining each of said conveying members to form a continuous chain around said discs and along said tracks, said discs being adapted to propel said conveying members to provide an upper flight of conveying members moving in one direction between said upper tracks and a lower flight of conveying members moving in the opposite direction between said lower tracks, a plurality of discharge means spaced along the length of travel of said conveying members and within said frame between the upper and lower flights of said conveying members, rail members carried by said frame adjacent said upper tracks, means for adjusting the space between individual of said rail members and said upper tracks, said linking mechanisms each being characterized by rail following means adapted to ride along one of said rail members, a camming arm extending from said rail following means to one of said rollers, and a rigid coupling member fixed to said camming arm and slidably connected to the camming arm of the linking mechanism next adjacent thereto whereby the angular position of both said camming member and said coupling member may be varied by a variation in the distance between the channel of one of said upper tracks in which said one of said rollers rides and said one of said rail members on which said rail following means rides to thereby vary the space between adjacent of said conveying members.

10. A machine for sorting articles comprising a frame, a pair of parallel transverse drive shafts mounted respectively at the front and back of said frame, spaced discs mounted on each of said shafts, said discs on one of said drive shafts being aligned longitudinally with said discs on the other of said drive shafts, means for rotating one of said drive shafts, drive means connecting said one of said drive shafts and the other, means associated with said drive means for adjusting the radial position of said other of said drive shafts with respect to said one of said drive shafts, pairs of upper tracks secured to said frame and aligned with the upper peripheries of said discs, said upper tracks being provided with inwardly opening opposed channels, a plurality of spaced conveying members disposed transversely of said frame, rollers mounted on the ends of each of said conveying members and being adapted to ride along said channels, linking mechanisms joining each of said conveying members to form a continuous chain around said discs and along said tracks, said discs being adapted to engage said rollers to thereby move said conveying members and provide an upper flight of conveying members moving in one direction between said upper tracks and a lower flight of conveying members moving in the opposite direction, rail members carried by said frame adjacent said upper tracks, means for adjusting the space between individual of said rail members and said upper tracks, said linking mechanisms each being characterized by wheels adapted to ride along one of said rail members, a camming arm extending from said wheel to one of said rollers, and a rigid coupling member fixed to said camming arm and slidably connected to the camming arm of the linking mechanism next adjacent thereto whereby the angular position of both said camming member and said coupling member may be varied by a variation in the distance between the channel of one of said upper tracks in which said one of said rollers rides and said one of said rail members on which said wheel rides to thereby vary the space between adjacent of said conveying members.

11. A machine for sorting articles comprising a frame, a pair of parallel transverse drive shafts mounted respectively at the front and back of said frame, spaced discs mounted on each of said shafts, said discs on one of said drive shafts being aligned longitudinally with said discs on the other of said drive shafts, means for rotating said drive shafts in synchronization with each other, pairs of upper and lower tracks secured to said frame and aligned substantially tangentially with the upper and lower peripheries of said discs, said upper tracks being provided with inwardly opening opposed channels, a plurality of spaced conveying members disposed transversely of said frame, rollers mounted on the ends of each of said conveying members and being adapted to ride along said tracks, linking mechanisms joining each of said conveying members to form a continuous chain around said discs and along said tracks, tines extending from said discs for engaging said rollers to provide an upper flight of conveying members moving in one direction between said upper tracks and a lower flight of conveying members moving in the opposite direction between said lower tracks, rail members carried by said frame adjacent said upper tracks, means for adjusting the space between said rail members and said upper track, said linking mechanisms each being characterized by a wheel adapted to ride along one of said rail members, a camming arm extending from said wheel to one of said rollers, a rigid coupling member fixed to said camming arm and slidably connected to the camming arm of the linking mechanism next adjacent thereto whereby the angular position of both said camming member and said coupling member may be varied by a variation in the distance between the channel of one of said upper tracks in which said one of said rollers rides and said one of said rail members on which said wheel rides to thereby vary the space between adjacent of said conveying members, and guide members for guiding said wheels around said discs.

12. In a machine for sorting articles having a frame with discs rotatable at the ends of said frame to move connected adjustably spaced conveying members along said frame and around said discs, the combination therewith of adjustable links between said conveying members for varying the effective distance between adjacent conveying members and means for varying the effective length of the upper flight of said conveying members, said means including a pair of shafts mounted at the ends of said frame, said discs being secured to said shaft, a sprocket fixed to the end of one of said shafts, a sprocket journalled on the other of said shafts, a chain connecting the aforesaid sprockets, means for rotating said one of said shafts, a disc fixed to the sprocket journalled on said other of said shafts, said last mentioned discs being provided with a plurality of slots, and a pin moveably fixed to said other of said shafts and selectively engageable in any one of said slots.

13. The structure defined in claim 12 including an arm fixed to said other of said shafts and carrying said pin, said slots being open ended radial slots around the periphery of their disc, said pin being moveable along said arm axially of said other of said shafts for engagement and disengagement with any one of said slots and spring means urging said pin into engagement therein.

14. In a sorting machine having successive parallel conveying means in the same plane, camming members interconnected between the ends of said conveying means, and means engageable with said camming members for varying the position of each of said camming members with respect to one of the ends of one of said conveying members to thereby vary the space between adjacent ones of said conveying means.

15. The structure defined in claim 14 wherein said camming members including moveable arcuate arms, the ends of which are connected to the ends of certain of said conveying means, said arcuate arms being engageable by their other ends with said means for varying the position of each of said camming members, and the intermediate portions of said camming arms being respectively slideably engaged by certain other of said camming members.

References Cited in the file of this patent

UNITED STATES PATENTS

| | | |
|---|---|---|
| 1,429,764 | O'Quinn | Sept. 19, 1922 |
| 1,843,453 | Littlefield | Feb. 2, 1932 |
| 2,645,342 | Roberts | July 14, 1953 |
| 2,782,922 | Bertinot | Feb. 26, 1957 |
| 2,787,366 | Systokis | Apr. 2, 1957 |

FOREIGN PATENTS

| | | |
|---|---|---|
| 384,298 | Germany | Oct. 31, 1923 |